United States Patent [19]

Corbett et al.

[11] 4,110,274

[45] Aug. 29, 1978

[54] METHOD FOR MAKING CROSSLINKED RESIN FOAMS FROM AN ETHYLENICALLY UNSATURATED DICARBOXYLIC ACID ANHYDRIDE AND A POLYISOCYANATE

[75] Inventors: John M. Corbett, Newark; Frederick J. Dechow, Thornville, both of Ohio

[73] Assignee: The Dow Chemical Company, Midland, Mich.

[21] Appl. No.: 842,720

[22] Filed: Oct. 17, 1977

[51] Int. Cl.$^2$ .............................. C08J 9/00; C08J 9/08
[52] U.S. Cl. .................................................... 521/157
[58] Field of Search ..... 260/2.5 AM, 2.5 N, 77.5 AM

[56] References Cited

U.S. PATENT DOCUMENTS

| | | | |
|---|---|---|---|
| 3,249,561 | 5/1966 | Hendrix | 260/2.5 AM |
| 3,300,420 | 1/1967 | Frey | 260/2.5 AM |
| 3,310,506 | 3/1967 | Amborski et al. | 260/2.5 N |
| 3,380,964 | 4/1968 | Grundschober et al. | 260/47 CB |
| 3,406,148 | 10/1968 | Sambeth et al. | 260/47 CB |
| 3,479,305 | 11/1969 | Kus et al. | 160/2.5 AM |
| 3,483,144 | 12/1969 | Lavin et al. | 260/2.5 AM |
| 3,489,696 | 1/1970 | Miller | 260/2.5 AM |
| 3,533,996 | 10/1970 | Grundschober et al. | 260/47 CB |
| 3,554,939 | 1/1971 | Lavin et al. | 260/2.5 AM |
| 3,562,189 | 2/1971 | Farrissey et al. | 260/2.5 AM |
| 3,620,987 | 11/1971 | McLaughlin et al. | 260/2.5 N |
| 3,644,234 | 2/1972 | Grieve | 260/2.5 AM |
| 3,772,216 | 11/1973 | Rosser | 260/2.5 AM |
| 3,890,272 | 6/1975 | D'Alelio | 260/47 UA |
| 4,001,149 | 1/1977 | Scaggs | 260/2.5 FP |
| 4,008,186 | 2/1977 | Scaggs | 260/2.5 FP |
| 4,016,114 | 4/1977 | Gruffaz et al. | 260/2.5 N |
| 4,057,518 | 11/1977 | Angeraud et al. | 260/2.5 N |

FOREIGN PATENT DOCUMENTS 2,517,106  10/1975  Fed. Rep. of Germany ....... 260/2.5 N

*Primary Examiner*—M. J. Welsh

[57] ABSTRACT

Cellular resin bodies having apparent density less than about 30 pounds per cubic foot, where the resin has highly crosslinked three-dimensional ethylenic polymer structure having amic acid groups and/or cyclic imide linkages, are made by reaction of polyisocyanates with certain polymerizable ethylenically unsaturated dicarboxylic acid cyclic anhydrides illustrated by maleic anhydride, and water. Mixture of the reactants and heating cause chemical interaction, evolution of carbon dioxide, ethylenic polymerization of intermediate reaction product, crosslinking, foaming and hardening of the resin. Cell formation is caused by carbon dioxide and water vapor in the resin reaction product. Resin foam products are infusible and insoluble in usual solvents and resist ignition and burning in air.

10 Claims, No Drawings

METHOD FOR MAKING CROSSLINKED RESIN FOAMS FROM AN ETHYLENICALLY UNSATURATED DICARBOXYLIC ACID ANHYDRIDE AND A POLYISOCYANATE

BACKGROUND OF THE INVENTION

This invention concerns cellular highly crosslinked, three dimensional ethylenic polymer resins having amic acid and/or cyclic imide linkages including (but not limited to) those having polymeric structure illustrated by the formula:

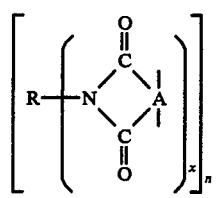
(Formula I)

wherein R is an organic radical having $x$ valence bonds on different carbon atoms, A is a tetravalent organic radical having a first pair of valences on vicinal carbon atoms attached to carbonyl groups and a second pair of valences on vicinal carbon atoms forming part of the polymer chain and arising by addition polymerization of a C=C ethylenic double bond in the monomeric form of A, $x$ is a small number at least 2, and $n$ is a large number. Such resin has carbon-to-carbon ethylenic polymer chains and multiple-imide crosslinkages. A polymerized N,N'-bis-maleimide of a diamine is an example of such resin where $x$ is 2 and A is

in Formula I. Amic acid resins have the group:

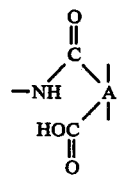

in place of at least some of the imide groups:

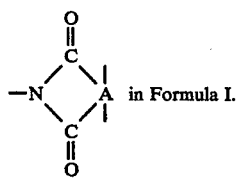

in Formula I.

Resins having a structure like that of Formula I where $x$ is 2 (i.e., bis-imide polymers) are known in non-cellular form, but foams of such resins have not heretofore been known. For example, such non-cellular, crosslinked resins from N,N'-bis-maleimides are described in U.S. Pat. Nos. 3,380,964 (F. Grundschober et al.), 3,406,148 (J. Sambeth et al.), 3,533,996 (F. Grundschober et al.), and 3,890,272 (G. F. D'Alelio).

The "polyimide foams" that are known in the art have resin structures different from that of Formula I and include those wherein the imide groups are recurring linkages in the main polymer chain such as those obtained by reaction of a dianhydride of a tetracarboxylic acid, e.g., pyromellitic dianhydride, and a diamine as described in U.S. Pat. Nos. 3,249,561 (W. R. Hendrix), 3,310,506 (L. E. Amborski et al.), 3,483,144 (E. Lavin et al.), and 3,554,939 (E. Lavin et al.). Foams having structures similar to those just mentioned are also made by reaction of a tetracarboxylic acid or dianhydride with a polyisocyanate as described in U.S. Pat. Nos. 3,300,420 (H. E. Frey), 3,479,305 (S. T. Kus et al.), 3,489,696 (G. W. Miller), 3,562,189 (W. J. Farrissey, Jr. et al.), 3,620,987 (A. M. McLaughlin et al.), 3,644,234 (R. L. Grieve), and 3,772,216 (R. W. Rosser et al). Another kind of foam from resins having "imide" linkages is described in German Offenlegungsschrift No. 25-17-106 by F. Zumstein et al. None of these prior art foam resins has resin polymeric structure like that of Formula I.

It would be desirable if there were a method and means for making cellular highly crosslinked resins having the general structure of Formula I. This invention provides improved method and means to make cellular or foamed resin products wherein the resin is a highly crosslinked, three dimensional, imide-crosslinked ethylenic polymer. It also provides such products wherein the resin is a highly crosslinked, three dimensional, ethylenic polymer having amic acid groups. It provides such method, means and products wherein the cellular products have apparent density less than about 30 pounds per cubic foot, especially ones having apparent density in the range from about 1.5 to about 6 pounds per cubic foot.

SUMMARY OF THE INVENTION

This invention provides a method for making cellular, highly crosslinked, three dimensional ethylenic polymer resins having amic acid groups and/or cyclic imide linkages.

In this method, the principal reaction starting materials are cyclic anhydrides of ethylenically unsaturated dicarboxylic acids and polyisocyanates. The unsaturated anhydrides have the general formula:

(Formula III)

wherein A is a divalent radical containing ethylenic unsaturation, i.e., a C=C double bond, and having the carbonyl groups attached to vicinal carbon atoms, preferably where A is one of the radicals represented by the formulae:

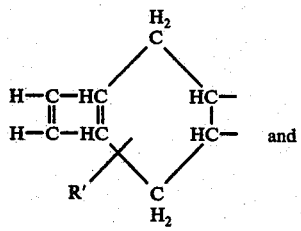 and 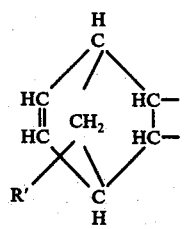

wherein R' is hydrogen or alkyl such as methyl. Formula III includes, for example, maleic anhydride, tetrahydrophthalic anhydride, and bicyclo(2.2.1)hept-5-ene-2,3-dicarboxylic anhydride.

The polyisocyanates have the general formula:

R—(NCO)$_x$ (Formula IV)

wherein R is an organic radical corresponding to R in Formula I, having at least 4 carbon atoms and "$x$" valence bonds on different carbon atoms, and $x$ is a small number from 2 to about 6 with a preferred average value from 2 to about 3. The polyisocyanates are illustrated by the isomeric tolylene diisocyanates ($x=2$) and the poly(methylene-phenylene) polyisocyanates having the general formula:

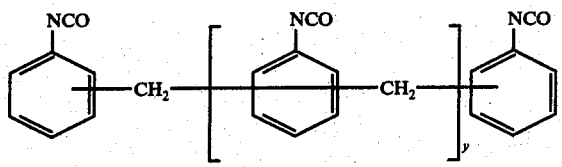

wherein $y$ is an integer from 0 to 4 preferably having an average value from 0 ($x=2$) to about 1 ($x=$about 3).

The interaction of anhydrides of Formula III with polyisocyanates of Formula IV and water, and ethylenic polymerization, lead to polymeric resins having amic acid groups, inter alia. The polyamic acid resins have the general formula:

(Formula V)

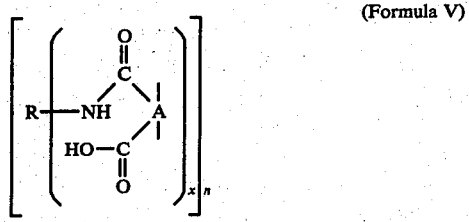

wherein R, A, $x$ and $n$ are as defined for Formulae I and IV. At higher temperatures at least some of the amic acid groups cyclize to imide groups corresponding to general Formula I. It will be understood by polymer chemists from the method described below that other chemical groups and linkages also occur and exist in the resin products of this invention, but the amic acid and cyclic imide groups and ethylenic polymer linkages represented in Formulae I and V are the predominant and characterizing features of the subject resin structures.

In the method of this invention, a reaction mixture is prepared from the starting anhydride and polyisocyanate. In one mode, these materials are mixed together in molten state, e.g. at a temperature of about 80° C, without added solvent. In other modes, a liquid solvent is used to dissolve the reactants. A measured predetermined proportion of water is added to the reaction mixture. Reaction occurs and carbon dioxide evolves from the reaction mixture. In some modes, when reaction has proceeded to the desired extent, a surfactant is added in measured, predetermined proportion and well mixed with the resulting flowable reaction mixture. In a variation, only a portion of the polyisocyanate charge is added to the initial reaction mixture, and an intermediate flowable reaction product is obtained from which $CO_2$ is allowed or caused to escape before the remainder of the polyisocyanate charge is added together with the surfactant.

The resulting flowable reaction mixture is transferred to a mold of desired shape and heated to effect further reaction, foaming and ethylenic polymerization of the resin structure. The resulting reaction product is a rigid, hard foam body which is infusible and insoluble in usual solvents. It glows red in the flame of natural gas burning in air with little or no smoke. Depending on reactant recipe and reaction conditions, the apparent density of the foam product varies from about 30 pounds per cubic foot (pcf) down to less than 1 pcf. The cell structure is small and uniform.

The foamed products are formed or fabricated into useful articles such as insulation and parts requiring low density and resistance to heat, such as building panels and walls of ovens and furnaces.

DETAILED DESCRIPTION AND EMBODIMENTS

The starting anhydride is any one or a mixture of cyclic anhydrides of ethylenically unsaturated dicarboxylic acids having the general Formula III as previously defined, e.g., maleic anhydride, tetrahydrophthalic anhydride, bicyclo(2.2.1)hept-5-ene-2,3-dicarboxylic anhydride and mixtures thereof.

The starting polyisocyanate is any one or a mixture of polyisocyanates having the general Formula IV as previously defined. In that formula R includes aliphatic, acyclic or cyclic, aromatic, combinations of aliphatic and aromatic, heterocyclic and bridged radicals. When R contains an aromatic ring, the ring is any single or multiple joined, fused or bridged ring system such as:

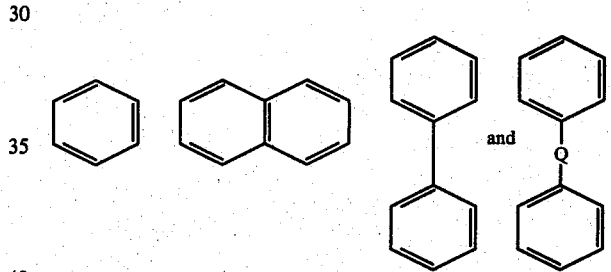

wherein the rings may be further substituted with alkyl, alkoxy, halo or like non-functional groups not reactive with isocyanate or carboxylic acid or anhydride groups, and Q is any bridging atom or group such as methylene or other alkylene, e.g., having up to four carbon atoms, oxygen, carbonyl, sulfur alone or in sulfoxide or sulfone, or phosphorus in phosphine oxide, phosphite or phosphate, or silicon in silane or siloxane, or tertiary amine nitrogen or the like. Specific examples (for illustration and not to exclude other examples) of such polyisocyanates of Formula IV include:

tetramethylenediisocyanate
hexamethylenediisocyanate
decamethylenediisocyanate
1,4-cyclohexylenediisocyanate
1,3-phenylenediisocyanate
1,4-phenylenediisocyanate
2,4-tolylenediisocyanate
2,5-tolylenediisocyanate
2,6-tolylenediisocyanate
the xylylenediisocyanates
4,4'-biphenylenediisocyanate
4,4'-diisocyanato-diphenylether
4,4'-diisocyanato-diphenylmethane
2,2-bis(4,4'-diisocyanato-diphenyl)propane
4,4'-diisocyanato-benzophenone
1,4-naphthalenediisocyanate 1,5-naphthalenediisocyanate
2,4,6-triisocyanato-toluene
and also including mixtures and crude products, such as the commercially available mixtures of 2,4- and 2,6-tolylenediisocyanate (TDI), commercial grade of 4,4'-diphenylmethanediisocyanate, and commercial grade of polymethylene polyphenylisocyanate.

The starting polyisocyanates and anhydrides are used in proportions generally in the range from about 0.6 to about 2, preferably 0.8 to 1.6, equivalents of polyisocyanate per mole of anhydride. As usual, an equivalent weight of polyisocyanate is that part of the amount of polyisocyanate in weight units which contains one isocyanato (—NCO) group; thus, the equivalent weight of the tolylenediisocyanate (molecular weight 174) is 87 weight units.

It will be understood that the reaction mixtures can also include modifying amounts of other reactant materials such as polymerizable or nonpolymerizable carboxylic acids or anhydrides such as maleic acid, citraconic acid, tetrahydrophthalic acid, bicyclo(2.2.1)hept-5-ene-2,3-dicarboxylic acid and other acids corresponding to the anhydrides of Formula III, oxalic acid, malonic acid, methylmalonic acid, succinic acid, methyl succinic acid, dimethylsuccinic acid, glutaric acid, adipic acid, pimelic acid, cyclobutane-1,2-dicarboxylic acid, cyclohexane-1,2-dicarboxylic acid, phthalic acid and their anhydrides.

The starting polyisocyanate and anhydride are mixed together and heated to reaction temperature, usually in the range from about 50° to about 150° C, preferably from about 60° to about 95° C. These reactants can be preheated and mixed together at the desired temperature, or one can be preheated and mixed with the other, and the mixture heated further, if necessary. Any of the reactants can be added incrementally or in two or more portions of the reaction mixture but it is essential to have the anhydride material in chemically equivalent excess in the reaction mixture at least until all of such anhydride material has been added.

Water is also added to the reaction mixture, usually in amount corresponding to from about 0.6 to about 2, preferably from 0.8 to 1.2 moles per mole of anhydride.

A catalyst may optionally also be added at this time, although a catalyst is usually not necessary. By "catalyst" herein is meant one which promotes reaction of isocyanates with active hydrogen compounds in accordance with known technology. If used, suitable such catalysts include alkanol amines such as are disclosed in U.S. Pat. No. 3,772,216 and various tertiary amines such as triethylamine, triethylenediamine, N,N,N',N'-tetramethyl-1,3-butanediamine, various azacyclic compounds such as the N,N-dialkylpiperazines, the various N,N',N''-trialkylaminoalkylhexahydrotriazines and the like. Other suitable catalysts include alkali metal salts such as lithium ricinoleate, and heavy metal salts such as cobalt naphthenate and tin salts of carboxylic acids, e.g. stannous octoate. The amount of such catalyst, when used, depends on the activity of the catalyst; amine catalysts are usually used in the range from about 0.1 to about 10 percent by weight of the reactants.

The mixture so formulated reacts with evolution of carbon dioxide. Some carbon dioxide may be allowed to escape before proceeding to the next step in this method. In batch variations where the anhydride material and polyisocyanate are mixed together at one time, the density of the cellular resin ultimately produced depends, inter alia, upon the amount of water added to the reaction mixture, the presence or absence of catalyst and concentration if present, and the length of the time interval from start to proceeding to the next step, described below. That time interval generally is from about one-half minute or less to about five minutes or more depending on the reaction system, conditions and results desired. During this time, carbon dioxide escapes from the reaction mixture as the reaction continues.

In the case of batch reactions where all of the reactants were initially mixed together at one time and after the reaction has been allowed to proceed with evolution of carbon dioxide for the desired time interval, the mixture is stabilized by adding a surfactant. The function of the surfactant is to stabilize the foam structure and to assist in forming and maintaining small, uniform gas bubbles which will lead to fine celled foam resin products. Typical surfactants for general use in resin foam technology are known per se as described in "Plastic Foams" by Calvin J. Benning, Vol. 2, pages 320–325. Suitable surfactants include organosilicone oils such as the alkyl siliconepolyoxyalkylene block copolymers as described by Benning (Loc. cit.) and in U.S. Pat. Nos. 3,489,696 and 3,772,216. Specific examples (for illustration and not to exclude other examples) of suitable surfactants include:

| Trade Name | Chemical Description |
| --- | --- |
| DC-193 | block copolymer of polysiloxane and polyalkylene oxide |
| Dowfax 2A1 | sodium dodecyl diphenyl ether disulfonate |
| Aerosol A103 | disodium ethoxylated nonyl-phenol half ester of sulfosuccinic acid |
| Antaron FC-34 | a fatty acid amido complex |

The surfactants are generally added to the flowable batch reaction mixture at the end of the specified reaction time interval in amount corresponding to from about 1 to about 10, preferably from about 2 to about 5, parts per 100 parts, by weight, of the combined starting polyisocyanate and anhydride reactants.

More water, in controlled proportion, may also be added to the reaction mixture concurrently with the surfactant, particularly if only small proportion of water was added to the initial starting reaction mixture. Usually, the amount of water added with the surfactant does not exceed about 10 parts per 100 parts, by weight, of the combined starting materials.

The surfactant is thoroughly mixed into the flowable reaction mixture and the resulting mixture is transferred from reaction vessel to a mold to complete the resin-forming and foaming reaction.

In a variation of the method, only a portion of the intended amount of starting polyisocyanate is initially charged to the full amount of starting anhydride material, together with a corresponding portion of the intended amount of water. In such variation, the carbon dioxide that forms can be allowed to escape before any more polyisocyanate and/or water is added. The resulting intermediate reaction product mixture is relatively stable and can be held for a time, particularly at temperatures below about 100° C., before proceeding to complete the resin-foaming method. This technique of charging only part of the polyisocyanate and substantially complete release of carbon dioxide during the first stage of reaction is somewhat equivalent to the timed interval in variations described above, i.e., after preparation of complete batch reaction mixture before adding surfactant to the resulting mixture. Later, to the resulting intermediate reaction product mixture are added the balance of the polyisocyanate charge and water, and surfactant, to complete the reaction mixture, which is then transferred to a mold to complete the resin-forming and foaming reaction.

Suitable batch molds are ones which are capable of being heated to resin finishing temperature (as described hereinafter) and from which the rigid resin foam shaped article can be removed. Usually, the mold is of metal, preferably coated with release material such as fused tetrafluoroethylene polymer resins. Alternatively, the mold cavity is lined with release foil such as aluminum foil which becomes bonded to the resin foam article molded therein. If substantially closed, the mold may be vented to allow escape of vaporized materials. Suitable molds provide means to at least partially form the foam into desired shape and include open molds where the reaction mixture and resulting resin foam have free, unconfined upper surfaces.

Continuous molds, e.g., for molding the resin foam into strips or sheets, are provided, for example, by a moving belt or belts. In one mode, the flowable reacting material is received between parallel horizontal belts moving at the same linear velocity through a reaction finishing zone to produce a foamed resin sheet or board of thickness determined by the separation of the parallel belts. In a variation, at least one of the belts carries a web of material such as aluminum foil, paper, glass cloth or other material which become bonded to the resin foam as facing layer on one or both sides of the foam sheet. The resulting foamed strip, sheet or board is edge trimmed and cut into appropriate widths and lengths as desired.

The step for converting the flowable reacting material into rigid resin foam product is carried out by heating the material in the mold to resin finishing temperature, usually above about 150° C. up to about 300° C. for time periods from about 5 minutes to about one hour. In general, the higher the temperature and longer the time of reaction, the more fully imidized is the resulting resin product. Typically, the reacting material is heated in its mold at 210°–275° C. for from 10 to 30 minutes. During this step, the ethylenic groups of the reaction products polymerize forming crosslinked resin structures. At lower temperatures many of the intermediate amic acid groups remain in the resulting resin product as illustrated in Formula V. At higher finishing temperatures most of the amic groups cyclize, forming cyclic imide groups in the resulting resin product, as shown in Formula I. At such higher finishing temperatures in an open mold, the resin product loses weight, which may be typically in the order of 15–25 percent of the initial reaction mixture, by vaporization of water and other volatile materials from the foam.

The resulting molded resin rigid foam product is then removed and allowed to cool.

If desired, various fillers and fibrous materials, especially inorganic fillers, glass beads, microballoons or fibers or carbon fibers, and other additives such as flame retardants can be added to the starting reaction mixture or to the intermediate flowable reacting mixture before completing the resin polymerization reaction.

The cellular crosslinked resin foam products are formed into useful shapes and articles by finishing the resin-forming and -foaming reaction in suitable shaped molds as herein described. Finished resin foam bodies are also post-fabricated into useful objects by conventional means of cutting, sawing, drilling or other machining.

The following examples illustrate the invention but are not to be taken as limiting its scope. Parts and percentages are by weight unless otherwise indicated or required by the context. In the examples, the polymeric methylene-phenyl polyisocyanate is a commercial product sold by Mobay Chemical Company under Trademark name "Mondur MR".

EXAMPLE 1

Mix 7.95 parts of melted maleic anhydride and 7.05 parts of tolylene diisocyanate (80% 2,4-, 20% 2,6-isomer mixture) in a container maintained at 50° C. with stirring. Stir in 1.5 parts of water and continue stirring while $CO_2$ is evolved. Two minutes after the addition of the water, add 0.8 part of DC-193, a siloxane polyoxyalkylene glycol block copolymer surfactant, with continued stirring until thoroughly mixed. Transfer the resulting flowable reaction mixture to a foam mold and heat in an oven at 210° C. for 15 minutes.

Typically, the resulting product is a cellular crosslinked resin, rigid foam having fine-celled structure and apparent density of about one pcf (pound per cubic foot).

EXAMPLE 2

Mix 5.4 part of melted maleic anhydride with 10.05 parts of a polymeric methylene—phenyl polyisocyanate having equivalent weight of 131 in a container maintained at 60° C. with stirring. Stir in one part of water and continue stirring while $CO_2$ is evolved. Three minutes after the addition of the water, add 0.5 part of DC-193, a siloxane polyoxyalkylene glycol block copolymer surfactant, with stirring continued until thorough mixing is complete. Transfer the resulting flowable reaction mixture to a foam mold and heat in an oven at 225° C. for 20 minutes.

Typically, the resulting product obtained in manner and under conditions as above is a cellular, crosslinked resin, rigid foam having fine-celled structure and apparent density in the order of 1.5 to 2 pcf. When the surfactant is added together with the water, the finished foam resin density is in the order of about 0.5 pcf.

EXAMPLE 3

In this example, 5.4 parts of molten maleic anhydride is mixed with 9.8 parts of polymeric methylene-phenyl polyisocyanate having equivalent weight 131 in a container maintained at 75° C. Various amounts of water are added as indicated below, with continued stirring. Three minutes after addition of the water, 0.5 part of DC-193 surfactant is added and thoroughly mixed into the reacting mixture. The resulting flowable reaction mixtures are finished in molds in an oven at 225° C. for 20 minutes, with results shown in Table I.

TABLE I

| Test No. | Water pph[(1)] | Foam Density pcf |
|---|---|---|
| 3.1 | 5.7 | 1.70 |
| 3.2 | 6.1 | 1.78 |
| 3.3 | 7.1 | 2.9 |
| 3.4 | 8.5 | 5.1 |
| 3.5 | 11.5 | 16.3 |
| 3.6 | 14.8 | 23.4 |

Note = [(1)]parts per hundred; parts of water per 100 parts of mixed anhydride and polyisocyanate.

EXAMPLE 4

In this example, the proportion of polymeric methylene-phenyl polyisocyanate to maleic anhydride is varied. The initial reactions are carried out at 75° C with continued stirring, the amount of water added is constant at one mole thereof per mole of anhydride, the reactions are allowed to proceed for three minutes, and the amount of DC-193 surfactant added is constant at 0.15 part per part of anhydride. The resulting flowable reaction mixtures are finished by heating in molds at 225° C for 20 minutes, with results shown in Table II.

TABLE II

| Test No. | Ratio, Isocyanate to Anhydride[2] | Foam Density pcf |
|---|---|---|
| 4.1 | 1.4 | 1.03 |
| 4.2 | 1.2 | 1.63 |
| 4.3 | 1.0 | 1.14 |
| 4.4 | 0.8 | 1.10 |
| 4.5 | 0.6 | 2.12 |

Note = [2]equivalents of starting isocyanate per mole of maleic anhydride

The foam products of Tests 4.4 and 4.5 have a larger proportion of open cells and thick struts in the cellular structure.

EXAMPLE 5

In this example, an optional amine catalyst is used in various proportions. The amine catalyst is 2-(8-heptadecenyl)-2-imidazoline-1-ethanol. The reaction mixtures are composed of 10.1 parts of polymeric methylene-phenyl polyisocyanate having equivalent weight of 131 and 5.4 parts of maleic anhydride maintained at 75° C. with stirring to which is added 0.84 part of water and an amount of amine catalyst shown in Table III, with continued stirring. After 2 minutes, 0.5 part of DC-193 surfactant and a further 0.25 part of water are added and thoroughly mixed into the reaction mixture. The mixtures are transferred to molds and finished by heating at 225° C. for 20 minutes, with results shown in Table III.

TABLE III

| Test No. | Catalyst pph[1] | Foam Density pcf | Description[2] |
|---|---|---|---|
| 5.1 | 1.7 | 1.02 | uniform, very fine cells |
| 5.2 | 1.1 | 0.65 | uniform cells, 15 mils |
| 5.3 | 0.5 | 0.58 | uniform cells, 20 mils |
| 5.4 | – nil | 0.37 | non-uniform, open cells |

Notes = [1]parts per hundred; parts of amine catalyst per 100 parts of mixed anhydride and polyisocyanate.
[2]cell size; approximate diameter, in mils.

Test 5.4 in the absence of catalyst is indication of the consequence of adding the surfactant too soon after adding water, before the mixture has properly reacted. With longer time between first water addition and surfactant addition, repetition of test 5.4 gives results like those of Example 2. With added catalyst, the reaction in the first step is accelerated and shorter reaction times are feasible.

EXAMPLE 6

In this example, water in various amounts is added with the surfactant in a series of tests using an optional amine catalyst. The reaction mixtures are composed of 10.1 parts of polymeric methylene-phenyl polyisocyanate having equivalent weight of 131 and 5.4 parts of maleic anhydride maintained at 75° C. with stirring to which is added 0.47 part of water and 0.078 part of the amine catalyst used in Example 5, with continued stirring. After two minutes, 0.25 part of DC-193 surfactant and further amounts of water as shown in Table IV are added and thoroughly mixed with the reaction mixture. The flowable mixtures are transferred to molds and the cross-linking polymerization reaction is finished by heating at 225° C. for 20 minutes, with results shown in Table IV.

TABLE IV

| Test No. | Water pph[1] | Foam Density pcf | Description |
|---|---|---|---|
| 6.1 | 4.6 | 0.66 | uniform cells |
| 6.2 | 5.8 | 0.84 | uniform cells |
| 6.3 | 6.4 | 0.68 | uniform cells |
| 6.4 | 7.0 | 0.54 | uniform cells |
| 6.5 | 7.5 | 0.49 | uniform cells |
| 6.6 | 8.2 | 0.69 | non-uniform, some voids |

Notes = [1]parts per hundred; parts of water per 100 parts of mixed anhydride and polyisocyanate.

EXAMPLE 7

In this example, tests are repeated with various periods of time of reaction between addition of water and addition of surfactant. The reaction mixtures are composed of 10.1 parts of polymeric methylene-phenyl polyisocyanate having equivalent weight of 131 and 5.4 parts of maleic anhydride maintained at 75° C. with stirring to each of which mixture is added 0.47 part of water with continued stirring. After reaction times shown in Table V, 0.25 part of DC-193 surfactant is added and thoroughly mixed into the reaction mixture. The resulting mixtures are transferred to molds and polymerization finished by heating at 225° C. for 20 minutes, with results shown in Table V.

TABLE V

| Test No. | Reaction Time Seconds[1] | Foam Density pfc |
|---|---|---|
| 7.1 | 50 | 0.64 |
| 7.2 | 100 | 1.01 |
| 7.3 | 150 | 1.52 |
| 7.4 | 200 | 1.80 |
| 7.5 | 250 | 3.70 |

Note = [1]Elapsed time between addition of water and addition of surfactant.

EXAMPLE 8

In this example, a reaction mixture is finished under various conditions of temperature and time. The reaction mixture is obtained from 10.1 parts of polymethylene-phenyl polyisocyanate having equivalent weight of 131 and 5.4 parts of maleic anhydride as starting materials, heating them together and maintaining the mixture at 75° C. with continued stirring, adding 0.47 part of water, and, after three minutes, adding 0.25 part of DC-193 surfactant. Portions of the resulting reacting material are then finished in molds by heating in an oven for the times and at temperatures shown in Table VI.

The resulting resin foams are then evaluated as to their behavior when exposed to open flame. For this purpose, a strip of each foam is held in a horizontal position 1.5 inches above the top and in the flame of a standard Bunsen burner burning natural gas in air. The pieces generally appear to burn initially and to form a char, but without melting or dripping and without change in size or shape or cellular appearance, and the char ultimately glows red in the flame. The time in seconds required of such exposure to flame before the resin foam chars is noted, and the gas burner flame is then removed. Usually, a flame briefly persists on the charred foam surface; the length of time in seconds such flame persists, after removal of the burner flame, before it goes out spontaneously, is also noted. The results are shown in Table VI.

The resin foam finished at the lowest temperature and shortest time (Test No. 8.01) has the largest proportion of residual amic acid groups and requires the longest exposure to flame before char forms. As the resin finishing temperature and time are increased, more of the amic acid groups are cyclized to imide groups (Test Nos. 8.02–8.15). The resin foam finished at 300° C. for 60 minutes (Test No. 8.15) is probably substantially completely in imide form, chars quickly in the ignition test flame, and has no persistant flame.

TABLE VI

| Test No. | Resin Finishing Conditions | | Ignition Test | |
|---|---|---|---|---|
| | Temp. °C | Time, Min. | Time to Char (sec.) | Persistence of Flame (sec.) |
| 8.01 | 200 | 5 | 48 | 6 |
| 8.02 | 200 | 10 | 41 | 4 |
| 8.03 | 200 | 30 | 34 | 4 |
| 8.04 | 200 | 60 | 31 | 3 |
| 8.05 | 210 | 5 | 35 | 5 |
| 8.06 | 210 | 10 | 27 | 4 |
| 8.07 | 210 | 30 | 25 | 3 |
| 8.08 | 210 | 60 | 25 | 2 |
| 8.09 | 220 | 5 | 32 | 4 |
| 8.10 | 220 | 10 | 38 | 4 |
| 8.11 | 230 | 10 | 26 | 4 |
| 8.12 | 240 | 10 | 25 | 3 |
| 8.13 | 250 | 10 | 20 | 2 |
| 8.14 | 250 | 30 | 10 | 2 |
| 8.15 | 300 | 60 | 4 | 0 |

EXAMPLE 9

Reaction mixtures are prepared as described in Example 8 and heated at 225° C. for 20 minutes. Properties of the resulting foam products are shown in Table VII.

TABLE VII

| Property | Sample A | Sample B |
|---|---|---|
| Density, pcf | 1.53 | 1.51 |
| K-Factor (BTU/hr-° F-ft$^2$/in.) | 0.255 | 0.260 |
| Open Cells, % | 31. | 47. |
| Compressive Strength, psi | 18.7 | 18.7 |
| Water Absorption, Vol. % | 1.1 | 1.3 |
| Friability, % (ASTM C-421-71) | <10. | <10. |

What is claimed is:

1. A method for making crosslinked ethylenic resin foams which comprises admixing and inter-reacting in a reaction mixture at least one ethylenically unsaturated dicarboxylic acid anhydride having the general formula:

wherein A is a divalent radical containing ethylenic unsaturation and having the carbonyl groups attached to vicinal carbon atoms, at least one polyisocyanate having the general formula:

$$R-(NCO)_x$$

wherein R is an organic radical having at least 4 carbon atoms and its valence bonds on different carbon atoms and x is a small number at least 2, and water, in proportions of from about 0.6 to about 2 equivalents of polyisocyanate per mole of anhydride and from about 0.6 to about 2 moles of water per mole of anhydride, at reaction temperature below about 150° C. to form a flowable reaction mixture, subsequently admixing a foam-stabilizing amount of surfactant into the resulting flowable reaction mixture and completing the resin-forming and foaming reactions by heating the reaction mixture at temperatures above about 150° C. to form a cellular resin body having apparent density less than about 30 pounds per cubic foot.

2. The method of claim 1 wherein the anhydride is maleic anhydride.

3. The method of claim 1 wherein the polyisocyanate is tolylene diisocyanate.

4. The method of claim 1 wherein the polyisocyanate is a methylenediphenyldiisocyanate.

5. The method of claim 1 wherein the polyisocyanate is polymethylene polyphenyl polyisocyanate.

6. The method of claim 1 wherein the reaction mixture is heated at temperatures between about 60° and about 95° C. for from about 0.5 to about 5 minutes before addition of surfactant to the resulting flowable reaction mixture.

7. The method of claim 1 wherein the flowable reaction mixture is further heated at temperatures in the range from about 210° to about 275° C. for from about 10 to about 30 minutes.

8. The method of claim 1 wherein the anhydride is maleic anhydride and the polyisocyanate is polymethylene polyphenyl polyisocyanate, the reaction mixture is maintained at temperatures in the range from about 60° to about 150° C. for from about 0.5 to about 5 minutes before addition of the surfactant, and the resulting flowable reaction mixture is further heated at temperatures in the range from about 210° to about 275° C. for from about 10 to about 30 minutes.

9. A cellular resin body having apparent density less than about 30 pounds per cubic foot, wherein the resin is a highly crosslinked three dimensional ethylenic polymer having amic acid groups, made by the method of claim 1.

10. A cellular resin body having apparent density less than about 30 pounds per cubic foot, wherein the resin is a highly crosslinked three dimensional ethylenic polymer having amic acid groups, made by the method of claim 8.

* * * * *